(12) United States Patent
     Tierney

(10) Patent No.:     US 9,286,287 B1
(45) Date of Patent:     Mar. 15, 2016

(54) REFERENCE CONTENT DETERMINATION FROM AUDIO CONTENT

(71) Applicant: Audible, Inc., Newark, NJ (US)

(72) Inventor: Robert Patrick Tierney, Jersey City, NJ (US)

(73) Assignee: Audible, Inc., Newark, NJ (US)

( * ) Notice: Subject to any disclaimer, the term of this patent is extended or adjusted under 35 U.S.C. 154(b) by 28 days.

(21) Appl. No.: 14/213,323

(22) Filed: Mar. 14, 2014

(51) Int. Cl.
     *G06F 17/27* (2006.01)
(52) U.S. Cl.
     CPC .................................. *G06F 17/2735* (2013.01)
(58) Field of Classification Search
     CPC .................................................. G06F 17/2735
     USPC ....................................................... 704/1–10
     See application file for complete search history.

(56) References Cited

U.S. PATENT DOCUMENTS

2014/0040713 A1*  2/2014  Dzik et al. ..................... 715/203
2014/0215340 A1*  7/2014  Shetty et al. .................. 715/727

* cited by examiner

*Primary Examiner* — Marcellus Augustin
(74) *Attorney, Agent, or Firm* — Knobbe, Martens, Olson & Bear, LLP

(57) ABSTRACT

Systems and methods are provided for causing aural and/or visual presentation of reference content, such as word definitions, in response to a request regarding a portion of media content during playback. In some embodiments, one or more words may be determined that may be of interest to the user from among words in a content window preceding a current playback position in the content, without the user specifying a specific word of interest. A presentation of reference content corresponding to the determined one or more words may be generated and presented aurally and/or visually in order to provide definitions, encyclopedia information, summary information, and/or other information regarding a portion of media content near the current playback position.

25 Claims, 7 Drawing Sheets

Word ranking table for
*A Tale of Two Cities*

| WORD | WORD DIFFICULTY SCORE | LOOKUP FREQUENCY SCORE |
|---|---|---|
| *IMMOLATE* | 70 | 66 |
| *AUSPICIOUS* | 60 | 55 |
| *CONSCIOUSNESS* | 50 | 50 |
| *COUNTENANCES* | 40 | 60 |
| *BOSOM* | 35 | 20 |
| *INFAMY* | 31 | 30 |
| *ALTAR* | 20 | 35 |
| *BENEFACTORS* | 15 | 5 |
| *TRAITOR* | 12 | 10 |
| *ASSUREDLY* | 11 | 7 |

*Fig. 4.*

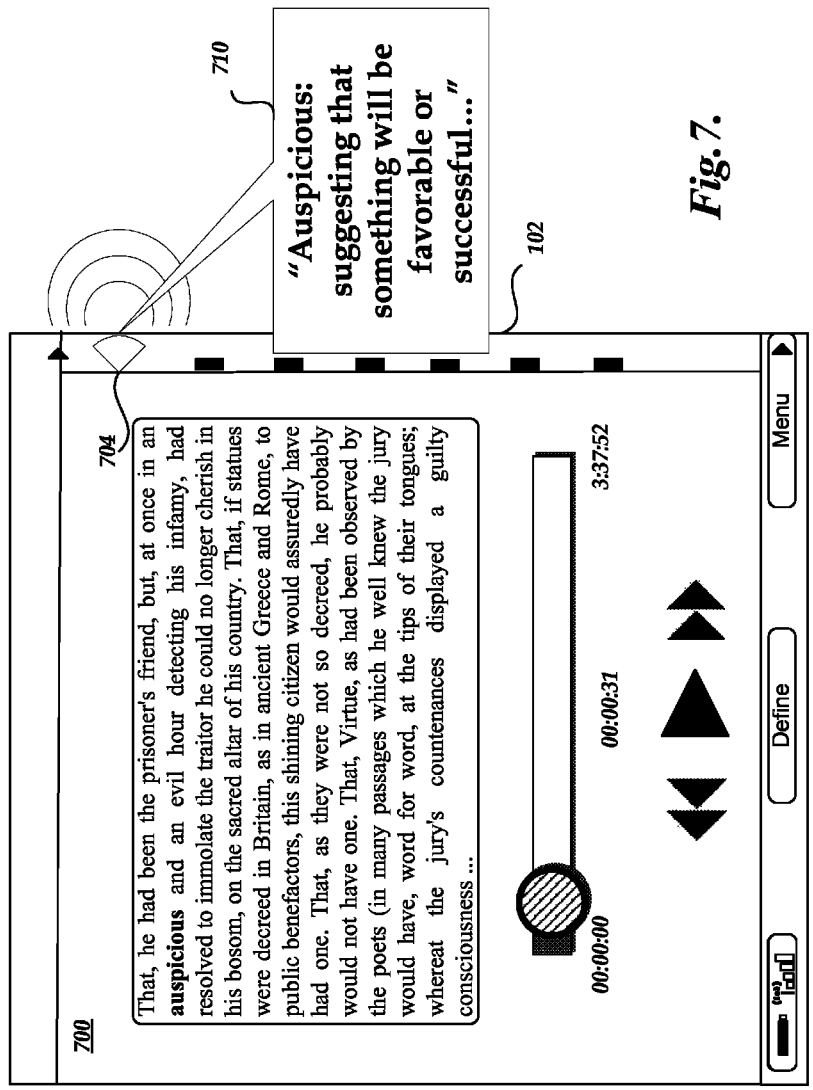

REFERENCE CONTENT DETERMINATION FROM AUDIO CONTENT

BACKGROUND

Generally described, computing devices may present various types of digital content to users for consumption. For example, computing devices may visually present items of content such as electronic books, movies, television programs and other multimedia content. Similarly, computing devices may aurally present content such as audio books, music, movies, and other multimedia content. Some computing devices may enable an individual to navigate through audio content by selecting options such as, pause, play, fast-forward, rewind, or rewind a fixed period of time such as thirty seconds. Additionally, some computing devices may display text corresponding to audio content, such as the text words of an electronic book. Some electronic book readers or other devices enable a user to select a specific word on a presented page of an electronic book in order to view a definition of the selected word.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 4 is a table diagram depicting illustrative mappings of words to each word's difficulty score, and to each word's lookup frequency score.

FIG. 7 is a pictorial diagram of an illustrative user interface presented during content playback, as well as representations of audio data corresponding to reference content related to a current playback position in the content.

DETAILED DESCRIPTION

Figure 1:
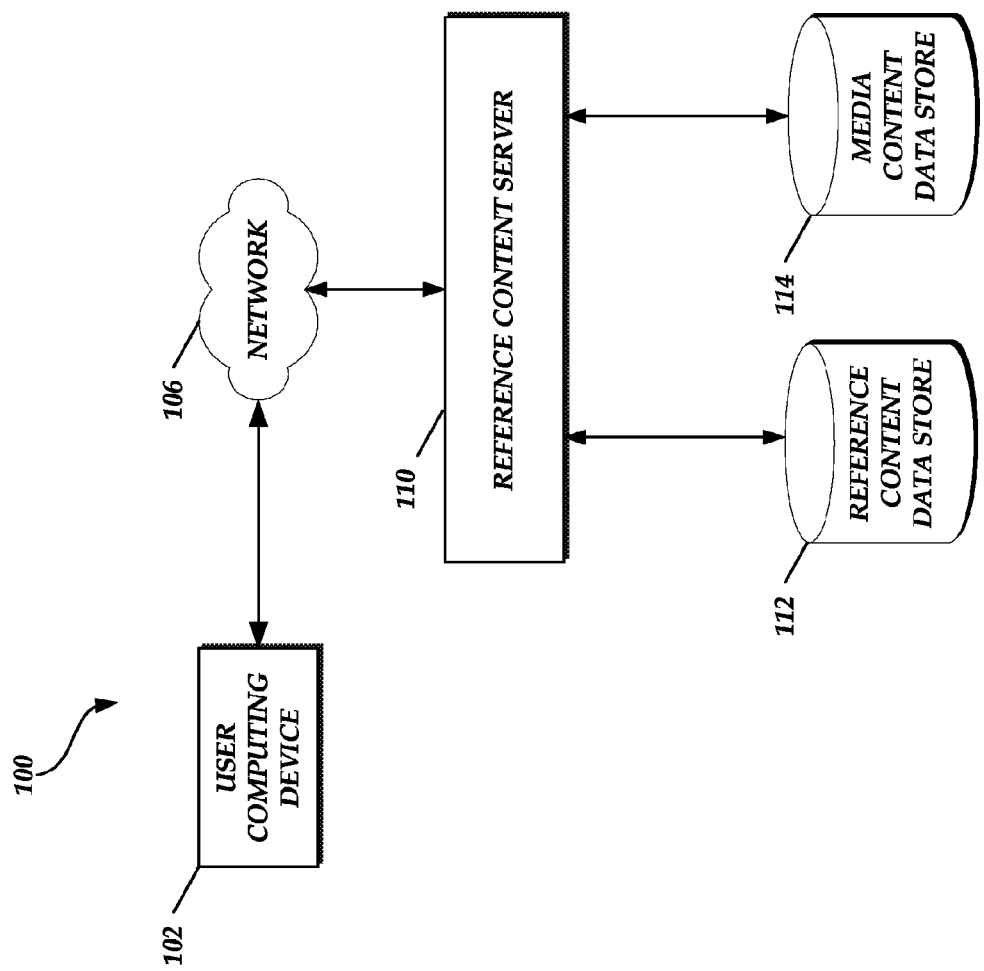
FIG. 1 is a schematic block diagram depicting an illustrative network environment for implementing a reference content service.

Generally described, aspects of the present disclosure are directed to presenting words audibly and/or visually, in response to a user request, that provide the user with reference information regarding a portion of media content during playback. For example, a user may use a personal computing device, such as a smartphone, to listen to an audio book. During playback of the audio book, the user may hear a word in which the user is interested. For example, a user may want a definition of a word and/or would like to know more about a word. The user may select a define option from the user interface of the smartphone. A system and/or service, as described herein, may determine one or more words of potential interest to the user near the current playback position of the audio content. The system and/or service may generate reference content for presentation, such as a definition and/or encyclopedic information associated with the one or more determined words. The reference content may then be presented to the user audibly and/or visually on the smartphone.

Aspects of the present disclosure relate to generating reference content associated with a portion of media content during playback. In this regard, a reference content service is disclosed that may present, during media playback of content, reference content associated with one or more words near a current media playback position. The reference content service may determine a subset of the words of likely interest to the user near a current media playback position based at least in part on word ranking scores. In some embodiments, the user may be presented with definitions and/or summary information, such as information from a dictionary, encyclopedia, and/or other reference source.

In some embodiments, the words for given portions of audio content (such as audio content of an audio book) may be determined based at least in part on a corresponding or related item of textual content (such as textual content of an electronic book version of the same underlying book). An item of textual content and a corresponding item of audio content are sometimes referred to herein as "associated" or "companion" content. An item of audio content and a corresponding item of associated textual content may be synchronized with one another. For example, a computing device implementing the reference content service may be provided with content synchronization information that maps one or more words in the item of associated textual content with a position of an identical word or words in the item of audio content (e.g., the identical word or words that are spoken, sung, recited, etc. in the item of audio content). In some embodiments, the synchronization information may indicate time positions and/or data locations within associated audio content that correspond to word, paragraph, or other positions within the textual content. More information regarding synchronizing an item of audio content with an item of associated textual content, as well as content synchronization information that may be stored in association with the synchronization, may be found in U.S. patent application Ser. No. 12/273,473 ("the '473 Application"), filed Nov. 18, 2008, entitled "SYNCHRONIZATION OF DIGITAL CONTENT," which is hereby incorporated by reference in its entirety. An example of associated content, as used herein, may include various representations of content discussed in the '473 Application.

"Reference content," as disclosed herein, may comprise dictionary data, encyclopedic data, definitions, summary information, and/or other information regarding the media content, depending on the embodiment. While the example of defining a word is often used herein, it will be appreciated that, in some embodiments, definitions, synonyms, antonyms, etymology, encyclopedic entries or other information may be provided for one or more words that are collectively considered a phrase, term or are otherwise used in combination to indicate a particular concept, idea, person, place, event, etc.

In some embodiments, a reference content module (when executed by one or more hardware processors), as disclosed herein, may cause a computing device to play at least a portion of audio content of an audio book, where the audio content is associated with textual content that includes text of the words spoken and/or time positions of the text words. During playback of the audio content by the computing device, the reference content module may receive user input indicating a request for reference content. The reference content module may then determine a word or phrase for which the user may be interested in receiving reference content, such as a definition or other description of the meaning of the word or phrase. In some embodiments, the word or phrase may be selected from a content window that precedes the playback position within the audio content. The word or phrase of potential interest may be determined based at least in part on word ranking scores of words within the given window of content near the current playback position, such as, but not limited to, word difficulty scores, lookup scores, frequency and/or scarcity data regarding words relative to other words in (a) the general English language (or other language), (b) the given book, and/or (c) a library of books. In some embodiments, the user does not provide any indication of the specific word or words of interest other than to indicate that reference content is desired with respect to recently played content. The reference content module may then cause the computing device to visually and/or aurally present reference content corresponding to the determined words associated with the content window.

While examples of words and/or audio content in the English language are often used herein, it will be appreciated that, in some embodiments, words and/or audio content in languages other than English may be used.

A reference content service, as disclosed herein, may be implemented in any of a number of environments in which content is presented. In some embodiments, the reference content service may be implemented as an application executed on a user computing device configured to present visual and/or audio content. A user interface to navigate the content may be provided by the user computing device as the application is executed. In other embodiments, the reference content service may be implemented via a content page hosted by a reference content server on a network. The content page may be accessed by a user computing device via a network resource browser. A user interface for requesting reference content may be provided on the content page, and the content may be streamed and/or downloaded from the reference content server to the user computing device for presentation thereon. Other implementations are possible in different embodiments.

While reference is frequently made herein to presenting an item of audio content that is synchronized to an item of associated textual content, the presented content to be referenced may include any type of content that is presented continuously over time. Examples of continuously-presented content may include audio books, podcasts, news programs, musical works, electronic books, television programs, video clips, movies, multimedia content, video games, and other types of content. Likewise, the associated textual content may include any type of digital textual content that is associated to the item of continuously-presented content, such as an electronic book, closed caption content, screenplay, script, libretto, transcription (e.g., speech-to-text) or other textual content. As will be appreciated, in some embodiments, textual content representing words spoken in various types of audio content may be determined dynamically using speech recognition and/or other known methods. Accordingly, in some embodiments, textual content and/or associated content synchronization information for a given portion of audio content may be determined dynamically in response to a user request for reference content.

Turning to FIG. 1, an illustrative network environment 100 is shown in which a reference content service may be implemented. The network environment 100 may include a user computing device 102, a network 106, a reference content server 110, a reference content data store 112, and a media content data store 114. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, smartphone, global positioning system (GPS) device, electronic book reader, set top box, camera, audio book player, digital media player, video game console, in-store kiosk, television, appliance, electronic device for inclusion in vehicles or machinery, gaming device, or the like.

The user computing device 102 may generally be capable of presenting audio and/or visual content to a user of the user computing device 102. For example, the user computing device 102 may be capable of playing audio content by directing audible or aural output through speakers, headphones, or the like. In some embodiments, the user computing device 102 may also be capable of presenting images, video content, text, and user interfaces on a display screen. The user computing device 102 may further be capable of receiving user input through a user input device, such as a keyboard, mouse, touchpad, touch screen, microphone, trackball, touchscreen, gamepad, or other input device known in the art.

The user computing device 102 may further be capable of accessing network resources, such as content pages, via the network 106. In some embodiments, continuously presented content may be presented through these content pages by the user computing device 102, e.g., by audio content being streamed over the network 106 to the user computing device 102. In other embodiments, content presented by the user computing device 102 may be retrieved from a data store that is local to the user computing device 102.

In some embodiments, the user computing device 102 stores one or more items of audio content, textual content, and/or associated content in an electronic data store. For example, the user computing device 102 may include one or more hard disk drives, solid state memories, and/or any other type of non-transitory computer readable storage medium accessible to or integrated within the user computing device 102. These items may be retrieved from storage and conveyed by the user computing device 102. The user computing device 102 may also store content synchronization information in the electronic data store. As discussed above, content synchronization information may map one or more words in an item of associated textual content with a presentation position of an identical word or words in an item of audio content.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. Protocols and components for communicating via the Internet or any of the other aforementioned types of communication networks are well known to those skilled in the art of computer communications and thus, need not be described in more detail herein.

The reference content server 110 is a computing device that may perform a variety of operations to implement a reference content service. For example, the reference content server may synchronize an item of audio content with an item of associated textual content. In some embodiments, the item of associated textual content may be a textual representation of the item of audio content that was transcribed therefrom. The reference content server 110 may provide items of audio content and/or associated textual content to the user computing device 102. In some embodiments, the reference content server 110 may present an item of audio content and/or visual content to the user computing device 102 for presentation. The reference content server 110 may present reference content associated with a word or phrase in response to a user request. Additional operations of the reference content server 110 are described below with respect to FIG. 2.

The reference content server 110 may be in communication with a reference content data store 112. The reference content data store 112 may electronically store, in some embodiments, dictionary data, encyclopedic data, and/or other reference data, as further discussed below. The reference content data store 112 may be embodied in hard disk drives, solid state memories, any other type of non-transitory computer-readable storage medium, and/or a file, a database, a relational database, stored in any such non-transitory computer-readable medium accessible to the reference content server 110. The reference content data store 112 may also be distributed or partitioned across multiple local and/or storage devices without departing from the spirit and scope of the present disclosure. For example, dictionary data and/or encyclopedic data may be stored in different storage devices and/or accessed via different services. In some embodiments, the reference content data store 112 may be a data storage web service.

The reference content server 110 may be in communication with an electronic media content data store 114. The media content data store 114 may electronically store items of audio content and/or associated textual content, such as audio books, podcasts, news programs, musical works, electronic books, television programs, video clips, movies, multimedia content, video games, and/or other types of content. The media content data store 114 may additionally store, in some embodiments, word ranking data, such as word difficulty scores and/or lookup frequency scores, as further discussed below. In some embodiments, the media content data store 114 may be embodied in various types of computer-readable storage similar to the reference content data store 112.

The user computing device 102 and reference content server 110 may each be embodied in a plurality of devices. A server or other computing system implementing the user computing device 102 and/or reference content server 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and reference content server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the reference content server 110 may be represented in a single physical server or, alternatively, may be split into multiple physical servers. In some embodiments, the entire reference content service may be represented in a single computing device, such as user computing device 102. Additionally, the environment 100 may not include a network 106.

Additionally, in some embodiments, the reference content service is implemented by one more virtual machines implemented in a hosted computing environment. The hosted computing environment may include one or more rapidly provisioned and/or released computing resources. The computing resources may include hardware computing, networking and/or storage devices configures with specifically configured computer-executable instructions. A hosted computing environment may also be referred to as a cloud computing environment.

Figure 2:
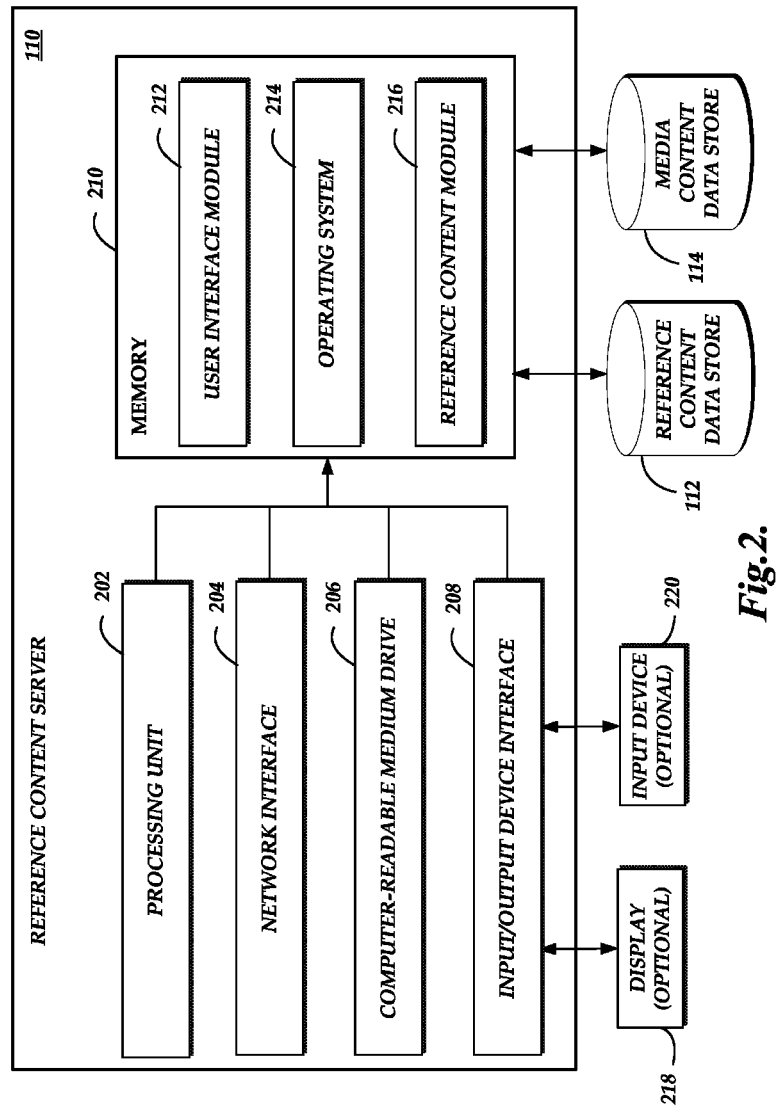
FIG. 2 is a schematic block diagram depicting an illustrative reference content server of the network environment depicted in FIG. 1.

FIG. 2 is a schematic diagram of the illustrative reference content server 110 shown in FIG. 1. The reference content server 110 includes an arrangement of computer hardware and software components that may be used to implement the reference content service. FIG. 2 depicts a general architecture of the reference content server 110 illustrated in FIG. 1. Those skilled in the art will appreciate that the reference content server 110 may include more (or fewer) components than those shown in FIG. 2. It is not necessary, however, that all of these generally conventional components be shown in order to provide an enabling disclosure.

The reference content server 110 may include a processing unit 202, a network interface 204, a non-transitory computer-readable medium drive 206, and an input/output device interface 208, all of which may communicate with one another by way of a communication bus. As illustrated, the reference content server 110 is optionally associated with, or in communication with, an optional display 218 and an optional input device 220. The display 218 and input device 220 may be used in embodiments in which users interact directly with the reference content server 110, such as an integrated in-store kiosk or integrated component for inclusion in an automobile, boat, train, or airplane, for example. In other embodiments, the display 218 and input device 220 may be included in the user computing device 102 shown in FIG. 1. The network interface 204 may provide reference content server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 may contain specifically configured computer program instructions that the processing unit 202 executes in order to implement one or more embodiments of the reference content service. The memory 210 generally includes RAM, ROM and/or other persistent or non-transitory computer-readable storage media. The memory 210 may store an operating system 214 that provides computer program instructions for use by the processing unit 202 in the general administration and operation of the reference content server 110. The memory 210 may further include other information for implementing aspects of the reference content service. For example, in one embodiment, the memory 210 includes a user interface module 212 that facilitates generation of user interfaces (such as by providing instructions therefor) for display upon a computing device, such as the user computing device 102. For example, a user interface may be displayed via a navigation interface such as a web browser implemented by the user computing device 102. In addition, the memory 210 may include or communicate with the reference content data store 112 and/or media content data store 114. Content stored in the media content data store 114 may include various types of content items, word difficulty data, lookup frequency data, word frequency data, word scarcity data, and/or content synchronization information.

In addition to the user interface module 212, the memory 210 may include a reference content module 216 that may be executed by the processing unit 202. In some embodiments, the reference content module 216 may implement various aspects of the present disclosure. For example, the reference content module 216 may present audio content and/or associated content, receive user requests for reference content, determine one or more words of likely interest to the user for given portions of content, cause presentation of reference content associated with the determined words during content playback, and/or other aspects of the disclosure described herein.

While the reference content module 216 is illustrated as implemented by the reference content server 110, in other embodiments, the reference content service may be implemented partially or entirely by the user computing device 102. For example, the reference content service may be provided as specifically configured hardware and/or specifically configured application software implemented by hardware on the user computing device 102. Accordingly, the user computing device 102 may include a reference content module 216 and other components that operate similarly to the components illustrated as part of the reference content server 110, including a processing unit 202, network interface 204, non-transitory computer-readable medium drive 206, input/output interface 208, memory 210, user interface module 212, and so forth.

Figure 3:
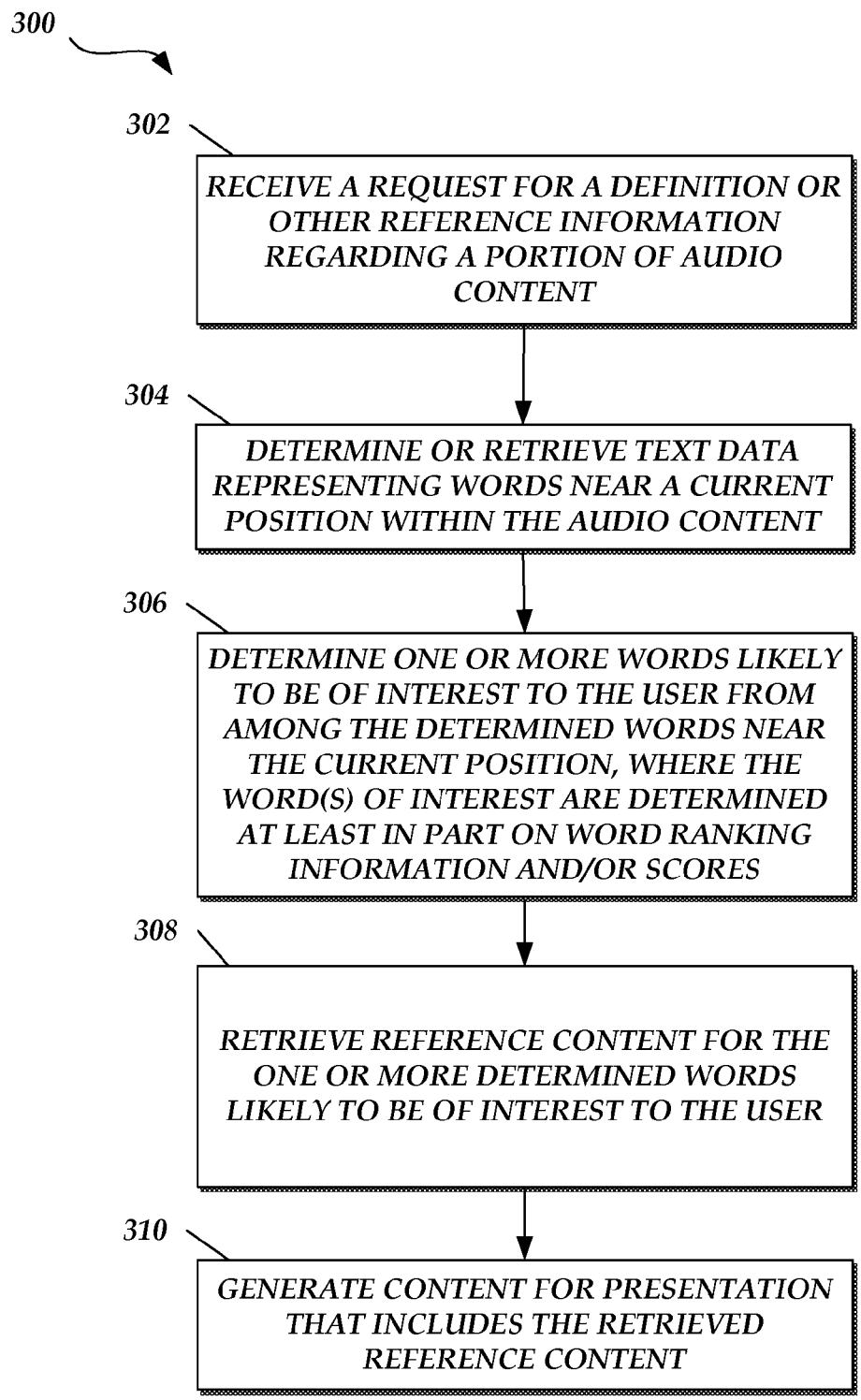
FIG. 3 is a flow diagram depicting an illustrative method for determining reference content related to a current playback position in audio content.

FIG. 3 is a flow diagram depicting an illustrative method 300 implemented by the reference content module 216 for presenting reference content during content playback. As discussed above, in some embodiments, the reference content server 110 may include the reference content module 216. In other embodiments, the user computing device 102 may include the reference content module 216, and may implement illustrative method 300 without any reference content server being needed. While illustrative method 300 will be described below with reference to an embodiment in which the content being played is audio content, in other embodiments, content other than audio content may be played, such as video content.

Illustrative method 300 begins at block 302, where the reference content module 216 receives a request for a definition and/or other reference information regarding a portion of audio content. For example, the request may be received via one or more user interface elements presented and/or other input mechanisms available to a user during playback of audio content, as discussed in more detail below with reference to FIG. 5. In some embodiments, a request for other information may be for summary information, such as, but not limited to, information from an encyclopedia. The request for reference content may include the current playback position within the audio content. As one example, the request may include the time of one minute and thirty seconds, which corresponds to the playback position within the audio content when a user interacted with the user interface, such as a selected user interface element, and/or when other input was received, such as a received spoken voice command. In some embodiments, user inputs may be received by the user computing device 102 and sent to the reference content module 216.

At block 304, the reference content module 216 determines and/or retrieves text data representing words near a current position within the audio content. The reference content module 216 may retrieve text data representing words spoken within the audio content being played. For example, the text data associated with an audio book may be retrieved from a synchronization and/or mapping file stored in the media content data store 114. The mapping file may include, in one embodiment, time units in the audio content that correspond to each word of the text data. The reference content module 216 may use a configurable window to retrieve the words near the current playback position that was received at block 302. For example, where the configurable window of time is ten seconds, the reference content module may retrieve all words within ten seconds of the current playback position. In the illustrative example, text words corresponding to one minute and twenty seconds to one minute and thirty seconds of the audio content may be retrieved. The reference content module 215 may determine all or some of the words within the configurable time window by using the current playback position time and the mapping filing, which may include words indexed by time.

In some embodiments, there may be variations of how the configurable content window is determined. For example, the configurable content window may be based on analyses of typical reaction times by users listening to audio content and requesting reference content. In some embodiments, the configurable content window may be selected and/or customized by the user via a user interface. In some embodiments, the reference content module 216 may determine an optimal configurable content window for a particular user. For example, the reference content module 216 may receive user feedback on whether the proper one or more words was selected and/or determined. The reference content module 216 may then determine the response time for requesting additional content for that particular user based on their usage and/or feedback history. For example, the average and/or maximum time for a content window may be used for a successfully determined word or phrase.

In some embodiments, the reference content module 216 may determine the text data within a configurable window dynamically. For example, there may be no mapping file but rather only the audio content. In some such embodiments, the reference content module 216 may dynamically convert the audio data into text data. In some embodiments, the reference content module 216 may implement one or more speech-to-text data methods to convert audio data into text data. In some embodiments, the reference content module 216 may store the text data within the configurable time window in a data structure. For example, a data structure such as a linked list and/or fixed size queue may be used to store all the words played within the given time window, such as ten seconds. As new words are played, the words that fall outside of the window may be released and/or removed from the data structure. As a result, when the request for reference content is retrieved, the reference content module 216 may retrieve the words near a current position within the audio content by retrieving all of the words from the data structure.

At block 306, the reference content module 216 determines one or more words likely to be of interest to the user from among the determined words near the current position. For example, the request received at block 302 may indicate that the user is interested in a definition and/or summary information for one or more words, but not identify which specific word or words are of interest. The reference content module 216 may determine one or more words of potential interest to the user based at least in part on word ranking information, word difficulty scores, lookup frequency scores, scarcity scores, and/or other data, as discussed in more detail below with reference to FIG. 4. The reference content module 216 may retrieve word ranking data from the media content data store 114 and/or may execute a word ranking module to determine one or more words that may be of interest to the user. For example, the reference module 216 may iterate over each word from the text data determined at block 304 to determine one or more words of likely interest to the user based on criteria such as, but not limited to, how obscure a word is or how often users look up a definition of a given word. The number of words and/or phrases to be identified may be configurable by the reference content module 216 and/or the reference content module 216 may enable the user to configure the number of words and/or phrases to be identified. For example, the reference module 216 may determine one, three, or ten words to be defined.

In some embodiments, such as where reference content includes encyclopedic information, the determined one or more words may include multi-word terms and/or phrases. In some such embodiments, multi-word terms and/or phrases corresponding to reference content may be determined based on the titles of articles and/or entries from encyclopedias or other reference sources. For example, reference content may be retrieved for the multi-word term and/or phrase "World War II." The determination of multi-word terms and/or phrases is discussed in more detail below with reference to FIG. 4.

In some embodiments, the reference content module 216 may determine one or more words likely to be of interest to the user based at least in part on personalization data regarding and/or corresponding to the user. For example, a user may specify a language proficiency level to determine the words that would be of interest to the user. The reference content module 216 may retrieve a selected reading level of the user, such as, beginner, intermediate, proficient, expert, and/or a grade level. In some embodiments, the reference content module may determine the reading and/or comprehension level of the user. The reference content module 216 may then determine words with word rankings and/or scores commensurate with the user's reading and/or comprehension level. The reference content module 216 may enable the user to modify their reading difficulty level to lower and/or increase the difficulty level of the words being presented. In some embodiments, the reference content module 216 may learn, for example, through machine learning techniques, words that the user likely found difficult. For example, after presenting reference content for the same word over a configurable threshold number of times, the reference content module 216 may cease presenting reference content for that particular word. In some embodiments, the reference content module 216 may learn the particular types and/or categories of words in which the user is interested and present similar words. In some embodiments, there may be other feedback and/or input mechanisms that allow users to indicate that they no longer desire reference content for that particular word and/or that they agree with the one or more determined words.

In some embodiments, the reference content module 216 may perform some pre-processing before retrieving word ranking information for words from the media content data store 114. For example, pronouns (such as "she," "they," "it," etc.), indefinite articles (such as "a," "the," etc.) and/or other information of little likely interest to a user may be filtered from the words near the current playback position. Therefore, the media content data store may be accessed fewer times to result in faster processing and/or determination of words to be of likely interest to the user. In some embodiments, such as where the reference content comprises encyclopedic information, the reference content module 216 may filter all words that are not nouns to increase processing of determining the words to be of likely interest to the user. For example, in the encyclopedic context, the reference content module 216 may only retrieve word ranking information and/or scores for nouns such as, but not limited to, "Britain," "atom," and/or "circuit." As will be appreciated, different pre-processing and/or filters may be applied based at least in part on the type of reference content associated with a user request, such as whether the request is for an encyclopedia entry or a dictionary definition.

At block 308, the reference content module 216 retrieves the reference content for the one or more determined words likely to be of interest to the user. The reference content module 216 may retrieve the reference data from the reference content data store 112. For example, in embodiments in which the reference content data store includes dictionary data, the reference content retrieved may comprise the definitions for the one or more words determined to be of interest to the user. The reference content module 216 may access definitions and/or other reference content data via an application programming interface ("API") with the reference content data store 112 and/or a network-accessible source. In some embodiments, the reference content may be retrieved via a web service, page, and/or application via the Internet or other network. For example, reference content may be retrieved from a network-accessible dictionary and/or encyclopedia, which may include crowd-sourced and/or user-generated entries. Similarly, reference content retrieved through a web service may be retrieved via an API.

In some embodiments, the reference content data store 112 includes dictionary data, encyclopedic data, and/or other reference data. In some embodiments, the reference content module 216 may retrieve both dictionary data and encyclopedic data for a word or phrase, while in other embodiments, the reference content module may only retrieve reference content from one source. The reference content module may rank and/or determine the relative importance of the dictionary and/or encyclopedic data. For example, a score may be returned for each type of data and the reference content module may prioritize the data that has the highest score. In some embodiments, a dictionary definition for a word or phrase may be retrieved if it exists in the data store, but if it does not exist in the data store, one or more additional reference sources may be searched for a definition and/or encyclopedic entry for the word or phrase.

At block 310, the reference content module 216 generates content for presentation aurally and/or visually that includes the retrieved reference content. The generated content for presentation may include the one or more words and their corresponding reference content. For example, a list of words and their definitions and/or encyclopedic information may be generated for presentation. The generated content for presentation may include audio content, textual content and/or other audible or visual content. The presentation of the reference content is discussed in more detail below with reference to FIG. 6 and FIG. 7.

FIG. 4 is a table diagram 400 depicting illustrative mappings of words to each word's difficulty score, and to each word's lookup frequency score. Table diagram 400 may be considered an illustrative representation of data that may be stored in the reference content data store 112 for retrieval by the reference content module 216 when determining words of potential interest to a user. While a portion of representative table 400 is illustrated for words from a book, *A Tale of Two Cities*, a similar table may be stored for a variety of content items other than books and/or may include words from a dictionary, encyclopedia, thesaurus, etc. As illustrated, the table 400 includes a list of words 420, where each word is associated with a word difficulty score 430 and a lookup frequency score 440. In some embodiments, the table 400 may include an entry for every word that appears in the book or other content item. In some embodiments, the table 400 may include words from multiple content items. In some embodiments, the table 400 may only include words that are available in one or more reference sources and/or data stores. For example, where a reference source is a dictionary, the world difficulty score 430 and/or lookup frequency score 440 may only include words found in a dictionary. Thus, if "Erin" is not in the dictionary, then it may not be present in the world difficulty score 430 and/or lookup frequency score 440. In some embodiments, only including words from a particular reference source may increase the retrieval and/or determination speed for finding words to be of likely interest to the user and/or retrieving such reference content. The table 400 may exclude words that are not associated with reference content (such as "a," "she," "the," etc.). In some embodiments, the word frequency table 400 may be generated based on an electronic book version of the book, and may be generated and stored in the media content data store 114 prior to the method 300 (discussed above) being implemented. The reference content module 216 may look up word difficulty and lookup frequency data and/or scores from the table 400 when presenting audio content and/or text content corresponding to one or more versions of the book.

The word difficulty score 430 for each word in the book may be, for example, a score that represents the likelihood that a reader will want reference content for the word and/or will not understand the word. The word difficulty score 430 may correspond to the obscurity and/or esotericism for each word. For example, if most English readers understand the word "cat" and/or the word "cat" is commonly used in the general English language, then "cat" would have a low difficulty score compared to other more obscure words in the English language. An example of a word that has a high difficulty score compared to other words may be "inchoate" because many English readers would not be able to define the word and/or the word "inchoate" is less commonly used in the general English language compared to other words. As illustrated by the table 400, "immolate" may have a word difficulty score of 70, which may be more difficult of a word to define for English readers than the word "traitor," which may have a word difficulty score of 12.

In some embodiments, various approaches, methods, techniques, and/or algorithms may be used to generate word difficulty scores 430. For example, a large library, archive and/or collection of text, electronic books, and/or works may be used to generate a predicted likelihood that a user would find a word difficult. The library of text and/or electronic books may be processed for frequency and/or scarcity of words. For example, word difficulty scores may be based at least in part on the frequency of word occurrences in a large body of text. In some embodiments, word difficulty scores may be based at least in part on word length, number of syllables, relative positions of consonants and/or vowels, and/or other characteristics of words in some combination thereof. For example, a formula may be used to generate a calculated word difficulty score, which may be combined and/or used with word frequency scores to determine word difficulty.

The lookup frequency score 440 for each word in the book may be, for example, a score that represents the frequency that a word is looked up specifically for that book, for a given dictionary or other specific reference source, and/or in general English without regard to the specific book. For example, a low lookup score associated with a given word may indicate that the word is not looked up often by users, such as by not having a frequently viewed definition and/or not being searched often in an electronic dictionary. In some embodiments, a lookup score may indicate how often a word is looked up in an encyclopedia, dictionary, and/or other reference content source. As illustrated by the table 400, "auspicious" may have a lookup frequency score of 55, which may indicate that "auspicious" is looked up in a dictionary more often than the word "bosom," which may have a lookup frequency score of 20. In some embodiments, the lookup frequency score for each word may be a composite score based on the lookup scores relative to two or more reference sources. The lookup frequency score 440 for each word may be determined, for example, based on an analysis of how often the word is looked up across a large number of books and/or other content items.

In other embodiments, a word ranking table similar to the word ranking table 400 may not include a word difficulty score and/or may include one or more additional entries for each word. For example, a word ranking table may include, in some embodiments, an indicator of a word's frequency within a book. In some embodiments, there may be different entries associated with the words in the word ranking table 400 than those illustrated. For example, the word ranking information may comprise separate scores for each type of reference content data store (such as a separate dictionary score and encyclopedia score).

In some embodiments, encyclopedia scores may be generated similarly to the approaches, methods, techniques, and/or algorithms used for word difficulty scores 430. For example, a list of all of the article titles or entry names in an encyclopedia may be compiled. A library of text and/or electronic books may be scanned, tracking each article title by frequency and assigning scores to titles in terms of scarcity. For example, the word and/or phrase "Word War II" may be scanned throughout the library of text and/or electronic books to determine the frequency and/or scarcity of the word and/or phrase within the library. Therefore, article titles with the greatest scarcity in the library of text and/or electronic books may indicate a greater likelihood that a user would be interested in the article because of the obscurity of the article titles. Conversely, in some embodiments, the greater the frequency of an article title in the library of text and/or electronic books may indicate that an article and/or topic is popular and that a user may be interested in the reference content.

In some embodiments, dictionary, encyclopedic, and/or other types of scores may be weighted relative to each other when a plurality of reference content data may be retrieved. For example, a weighting formula may be determined, experimentally, to adjust the scarcity rankings and/or scores of encyclopedia articles downwards relative to definitions. Therefore, the scarcity index and/or score for words for dictionary purposes may be weighted heavier for greater importance relative to a scarcity index and/or score for words for encyclopedia purposes.

In some embodiments, a word difficulty score 430, lookup frequency score 440, and/or some other score may be dynamically determined by the reference content module 216. For example, one or more formulas and/or algorithms for determining word difficulty may be executed or applied each time that there is a retrieval request for the word ranking score of a word. The dynamic calculation of word scores may result in dynamically changing word scores and/or reduced storage requirements for the media content data store 114.

Figure 5:
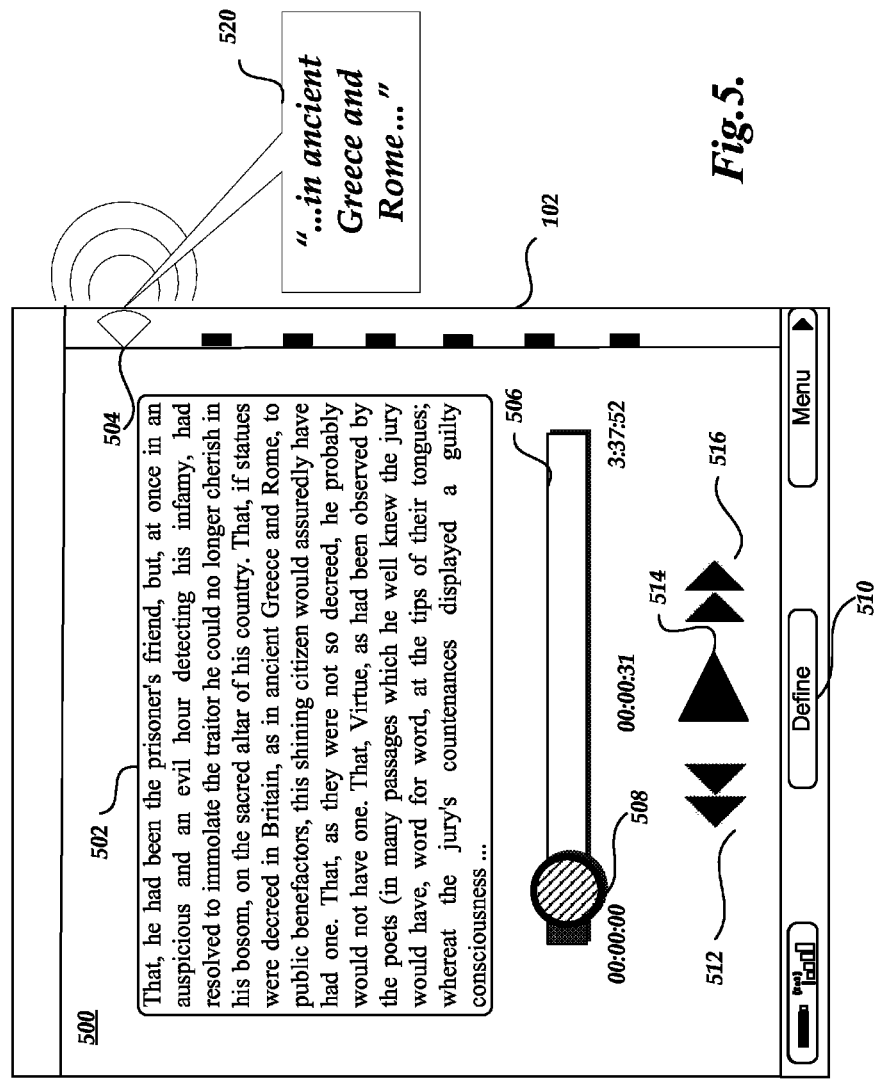
FIG. 5 is a pictorial diagram of an illustrative user interface presented during content playback, as well as representations of audio data corresponding to a current playback position in the content.

FIG. 5 is a pictorial diagram that includes an illustrative user interface 500 presented during content playback, as well as a representation of audio 520 corresponding to words determined for a current window of content. As illustrated, the user interface 500 may be displayed on user computing device 102. The user interface may be generated at least in part by the user computing device 102 and/or the reference content server 110, depending on the embodiment. As illustrated, user computing device 102 may aurally present audio 520 corresponding to words via one or more speakers 504 and/or one or more audio outputs, which may be provided to speakers or headphones. Example user interface 500 additionally includes a displayed portion of the text content 502, which represents text of the spoken words of the audio data (such as an audio book) starting at the current playback position. Text content 502 is shown for illustrative purposes only and may not be displayed in other embodiments. The audio 520 presented in the illustrated example includes narrated audio content, which are the spoken words or phrases "in ancient Greece and Rome."

The example user interface 500 includes a define option 510 that may be selected by a user to request reference content. In some embodiments, a request for reference content may be initiated by the user by speaking into a microphone and/or other audio input associated with user computing 102. For example, a user may speak the word "define" and/or "tell me more" to receive a definition, summary information, and/or other reference content. The reference content module 216 may receive the reference content request generated from user interaction with the define option 510 and/or some other user interaction or input. The reference content request may be received, for example, based on the illustrative method 300, discussed above.

In some embodiments, the illustrative user interface 500 may present video content and/or other visual content for display. For example, a user may watch video on the user computing device 102 and request reference content based on the audio content of the video. In one embodiment, the user computing device 102 may be a television and/or a remote control associated with the television. The television may be capable of displaying closed caption text associated with video content being played by the television. The remote control may comprise a button and/or option for requesting reference content based on the audio of the program and/or content being played on the television.

Figure 6:
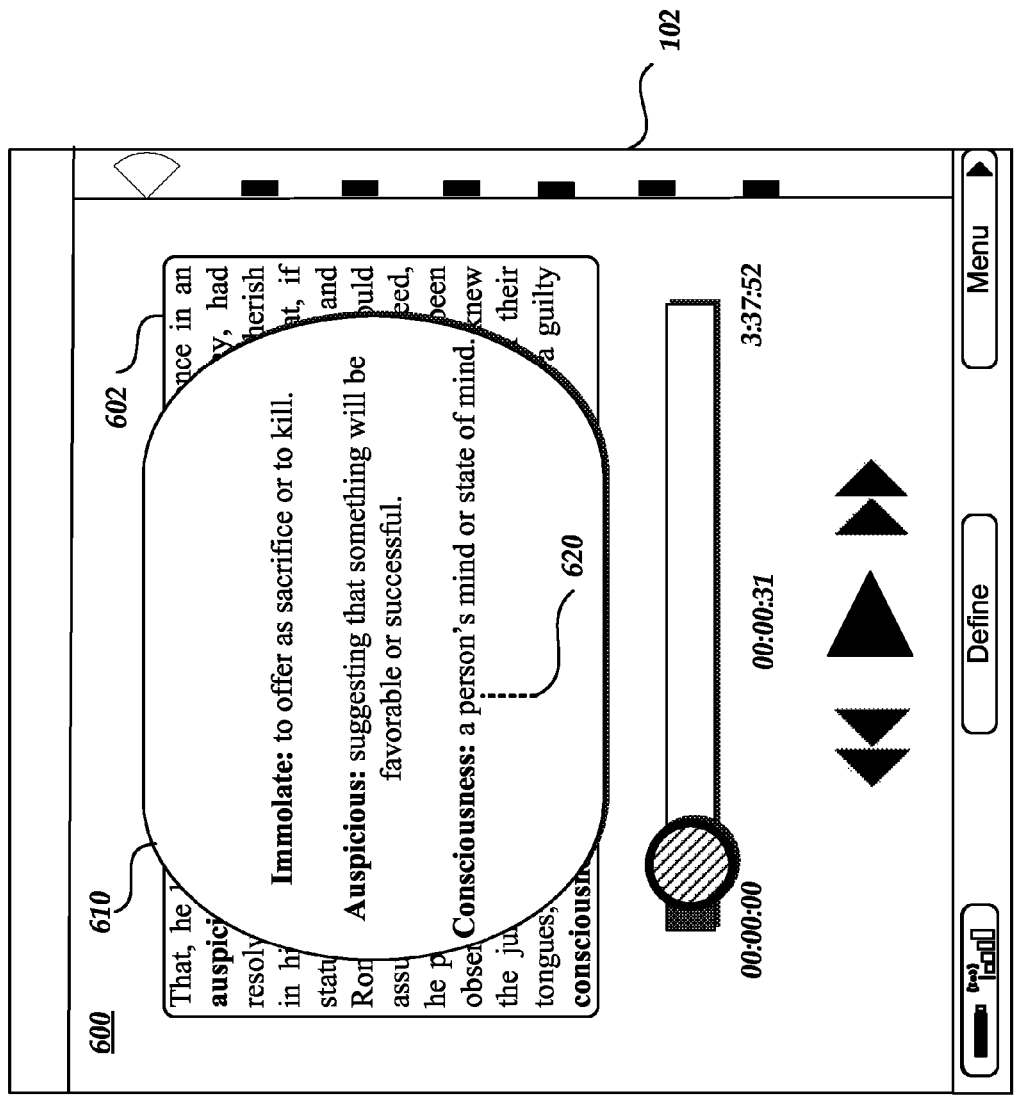
FIG. 6 is a pictorial diagram of an illustrative user interface presented during content playback, as well as presentations of reference content related to a current playback position in the content.

FIG. 6 is a pictorial diagram that includes an illustrative user interface 600 presented during content playback, as well as reference content 610 determined for a current window of content. As illustrated, user interface 600 includes many elements similar to user interface 500 discussed above. Example user interface 600 includes a displayed portion of reference content 610, which represents text definitions of the spoken words of the audio data, such as the words "immolate," "auspicious," and/or "consciousness." The portion of reference content 610 may be displayed in response to the received request for reference content illustrated in FIG. 5. In some embodiments, only a definition and/or reference content for one word may be shown. The ellipsis 620 represents that more than three words and their corresponding reference content may be displayed. The reference content 610 may have been determined and presented by the reference content module 216 based on the reference content module 216 determining words within the content window and/or time near the current playback position. The content may include, for example, at least a portion of the content illustrated in text content 602. The determined words may have been selected, for example, based on the illustrative method 300, discussed above.

In some embodiments, reference content 610 may include a mixture of reference content data. For example, reference content 610 may include dictionary definitions, encyclopedia entries, and/or other information. According to one embodiment, if a word has both a dictionary definition and an encyclopedia entry, the dictionary definition may be the only data to be displayed and/or presented. Additionally, there may be a selectable option for a user to view additional information, such as the encyclopedia entry.

In some embodiments, audio playback may pause and/or stop when reference content 610 is displayed and/or presented. For example, audio playback may not continue until a user closes and/or minimizes the reference content 610. In other embodiments, audio playback may not pause when reference content 610 is presented.

In some embodiments, the illustrative user interface 600 may provide input mechanisms to receive feedback from the user. For example, reference content 610 may include selectable options such as a "thumbs up" and/or "thumbs down" for individual or all of the displayed words in the reference content 610 to indicate that the user would like to see more or less of the presented reference content in the future. As a result, the reference content module 216 may have access to the user preferences and/or history of the user to improve future determinations of the words and/or reference content to display to the user.

FIG. 7 is a pictorial diagram that includes an illustrative user interface 700 presented during content playback, as well as a representation of audio 710 determined for a current window of content. As illustrated, user interface 700 includes many elements similar to user interface 500 and/or user interface 600 discussed above. Example user interface 700 includes a representation of audio 710, which is spoken words of one or more definitions and/or other reference content for the word "auspicious," which the reference content module 216 may have determined to be of potential interest to the user. In the embodiment illustrated in FIG. 7, definitions and/or other reference content may be presented audibly instead of or in addition to visually as text (such as shown in FIG. 6). In some embodiments, the audible presentation of reference content may be generated dynamically by implementing text-to-speech methods with respect to a retrieved textual definition. In the illustrative user interface 700, audio content playback of the primary content (such as an audio book) may stop so the representation of audio 710, including the reference content, may be understood by and/or played to the user. The ellipsis illustrated in representation of audio 710 may illustrate that more than one word and/or corresponding reference content may be played in response to a request for reference content. Once presentation of the representation of audio 710 finishes and/or completes, the primary audio content playback may resume.

In some embodiments, it will be appreciated that disclosed herein are systems and methods that allow the retrieval of reference content exclusively through audio input and/or output mechanisms. For example, a user may listen to audio content during playback. The user may speak "define" and/or "tell me more," for example. The reference content module 216 may identify and/or retrieve reference content based on the current playback position when the request was received. The reference content module 216 may then generate reference content for audio output to the user. As discussed above, playback of the original audio content may resume upon completion of playback of the reference content.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   an electronic dictionary data store configured to at least store a definition for each of a plurality of words; and
   a computing system comprising one or more hardware computing devices, said computing system in communication with the electronic dictionary data store, and configured to at least:
   receive a definition request initiated by a user during playback of an audio book, wherein the definition request comprises a current playback position associated with the audio book;
   determine text data representing a plurality of words spoken in a subset of the audio book preceding the current playback position;
   select, from the text data, a word to define, wherein the word to define has a highest word score among words appearing in the text data, wherein the highest word score is based at least in part on at least one of (a) a number of times the word appears in a collection of content or (b) a number of times the word is searched in a dictionary;
   retrieve a definition from the electronic dictionary data store for the word to define; and
   generate content for presentation that comprises the retrieved definition.

2. The system of claim 1, wherein the computing system is further configured to at least:
   determine the number of times the word appears in the collection of content;
   determine a scarcity score that has an inverse relationship with the number of times the word appears in the collection of content;
   determine the number of times the word is searched in the dictionary; and
   assign at least one of (a) the scarcity score or (b) the number of times the word is searched in the dictionary to a word score for the word.

3. The system of claim 1, wherein the definition request is received based at least in part on a voice command received via audio input.

4. A system comprising:
   an electronic reference content data store configured to at least store reference content for each of a plurality of words; and
   a computing system comprising one or more hardware computing devices, said computing system in communication with the electronic reference content data store, and configured to at least:
   receive a reference content request initiated during playback of media content;
   determine text data representing a plurality of words spoken in a subset of the media content preceding a current playback position within the media content;
   select a word with a highest word score among words appearing in the text data, wherein the highest word score is based at least in part on at least one of (a) a number of times the word appears in a collection of content or (b) a number of times the word is searched in a reference source;
   retrieve reference content from the electronic reference content data store for the word; and
   generate content for presentation that comprises the retrieved reference content.

5. The system of claim 4, wherein the computing system is further configured to at least:
   determine the number of times the word appears in the collection of content; and
   determine a word score, for the word, that (a) has an inverse relationship with the number of times the word appears in the collection of content, and (b) is based at least in part on at least one of: a character length of the word or a number of syllables in the word.

6. The system of claim 4, wherein the subset of the media content is determined based at least in part on a configurable content window.

7. The system of claim 4, wherein the computing system is further configured to at least:
   determine the number of times the word is searched in the reference source; and
   assign the number of times the word is searched in the reference source to a word score.

8. The system of claim 4, wherein the reference content stored in the electronic reference content data store comprises at least one of dictionary content, thesaurus content, or encyclopedic content.

9. The system of claim 4, wherein the media content comprises recorded narration audio data.

10. The system of claim 4, wherein the media content comprises recorded video data.

11. The system of claim 4, wherein the reference content request is received based at least in part on a voice command received via audio input.

12. A computer-implemented method comprising:
   as implemented by one or more computing devices configured with specific executable instructions,
      receiving a reference content request initiated during playback of media content;
      in response to the reference content request, determining text data representing a plurality of words spoken in a subset of the media content relative to a current playback position within the media content;
      selecting, from the text data, a term with a highest term score, wherein the highest term score is based at least in part on at least one of (a) a number of times the term appears in a collection of content or (b) a number of times the term is searched in a reference source;
      retrieving reference content associated with the term; and
      generating content for presentation that comprises the retrieved reference content.

13. The computer-implemented method of claim 12, further comprising:
   determining the number of times the term appears in the collection of content; and
   determining a term score for the term that has an inverse relationship with the number of times the term appears in the collection of content.

14. The computer-implemented method of claim 12, wherein the subset of the media content is determined based at least in part on a configurable content window.

15. The computer-implemented method of claim 12, further comprising:
   determining the number of times the term is searched in the reference source; and
   determining a term score, for the term, that corresponds to the number of times the term is searched in the reference source.

16. The computer-implemented method of claim 12, wherein the reference content comprises at least one of dictionary data or encyclopedic data.

17. The computer-implemented method of claim 12, wherein the media content comprises recorded narration audio data.

18. The computer-implemented method of claim 12, wherein selecting the term is further based at least in part on a determined reading level of the user.

19. The computer-implemented method of claim 12, wherein the term comprises two or more words.

20. The computer-implemented method of claim 12, wherein reference content is associated with two or more terms.

21. The computer-implemented method of claim 12, wherein the generated content for presentation comprises at least one of audio data or text data.

22. A computer-readable, non-transitory storage medium storing computer executable instructions that, when executed by one or more computing devices, configure the one or more computing devices to perform operations comprising:
   receiving a reference content request initiated during playback of media content;
   in response to the request, determining text data representing a plurality of words spoken in a subset of the media content relative to a current playback position within the media content;
   selecting, from the text data, a term with a highest term score, wherein the highest term score is based at least in part on at least one of (a) a number of times the term appears in a collection of content or (b) a number of times the term is searched in a reference source;
   retrieving reference content for the term; and
   generating content for presentation that comprises the retrieved reference content.

23. The computer-readable, non-transitory storage medium of claim 22, wherein the media content comprises recorded narration audio data.

24. The computer-readable, non-transitory storage medium of claim 22, wherein the one or more computing devices perform operations further comprising:
   determining the number of times the term appears in the collection of content; and
   determining a term score, for the term, that has an inverse relationship with the number of times the term appears in the collection of content.

25. The computer-readable, non-transitory storage medium of claim 22, wherein the one or more computing devices perform operations further comprising:
   determining the number of times the term is searched in the reference source; and
   determining a term score, for the term, that corresponds to the number of times the word is searched in the reference source.

* * * * *